(12) United States Patent
Gaal

(10) Patent No.: US 7,424,270 B2
(45) Date of Patent: Sep. 9, 2008

(54) FEEDBACK DECODING TECHNIQUES IN A WIRELESS COMMUNICATIONS SYSTEM

(75) Inventor: Peter Gaal, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 146 days.

(21) Appl. No.: 10/256,156

(22) Filed: Sep. 25, 2002

(65) Prior Publication Data

US 2004/0203475 A1    Oct. 14, 2004

(51) Int. Cl.
H04B 1/00    (2006.01)
H04B 17/00    (2006.01)

(52) U.S. Cl. .................... 455/69; 455/67.11; 455/226.1

(58) Field of Classification Search .............. 455/67.11, 455/69, 13.4, 161.3, 226.1–226.3; 370/332
See application file for complete search history.

(56) References Cited

U.S. PATENT DOCUMENTS 6,263,467 B1* 7/2001 Hladik et al. ............... 714/755
7,054,631 B2* 5/2006 Tee ............................. 455/436

FOREIGN PATENT DOCUMENTS

EP    1130834    9/2001
WO    0178220    10/2001
WO    02021756    3/2002

OTHER PUBLICATIONS

International Search Report, PCT/US03/030220, International Search Authority EPO Feb, 10, 2004.

* cited by examiner

Primary Examiner—Matthew Anderson
Assistant Examiner—Eugene Yun
(74) Attorney, Agent, or Firm—Kent D. Baker; James K. O'Hare; Thomas R. Rouse

(57) ABSTRACT

Systems and techniques are disclosed relating to communications. The systems and techniques involve receiving a feedback parameter relating to a signal transmission, assigning a probability value to one or more of a plurality of parameter values as a function of the feedback parameter, selecting one of the parameter values as a function of the probability value assignments, and controlling the signal transmission as a function of the selected one of the parameter values. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or the meaning of the claims.

58 Claims, 9 Drawing Sheets

FEEDBACK DECODING TECHNIQUES IN A WIRELESS COMMUNICATIONS SYSTEM

BACKGROUND

1. Field

The present invention relates generally to communications, and more specifically, to feedback decoding techniques in a wireless communications system.

2. Background

The function of a receiver in a wireless communications system is to detect a desired signal in the presence of noise, interference and other disturbances in the wireless channel. Noise arises from a variety of sources including cosmic noise, atmospheric noise, and solar noise, as well as thermal noise generated within the receiver itself. Interference, on the other hand, results from external radio transmissions. For example, in cellular communications, interference may occur between users in different cellular regions using the same carrier frequency. Interference may also occur when energy from one carrier spills over into adjacent channels. The ratio of the carrier to the interference is called the carrier-to-interference (C/I) ratio. A minimum C/I ratio is generally required to achieve a desired quality of service.

In multi-access communications systems, techniques to increase bandwidth are commonly employed to maximize user capacity. For example, many transmitter designs adaptively increase the data rate to maintain the lowest C/I ratio necessary to achieve the desired quality of service. This can be achieved by estimating the C/I ratio, or other quality parameter, at the receiver and providing feedback to the transmitter to control the data rate. The effectiveness of this approach depends on the ability of the transmitter to decode the feedback. Increasing the power of the feedback is not always a viable approach because it tends to increase the interference for other users. Accordingly, efficient decoding techniques are needed to increase the reliability of the feedback at the transmitter.

SUMMARY

In one aspect of the present invention, a method of communications includes receiving a feedback parameter relating to a signal transmission, assigning a probability value to one or more of a plurality of parameter values as a function of the feedback parameter, selecting one of the parameter values as a function of the probability value assignments, and controlling the signal transmission as a function of the selected one of the parameter values.

In another aspect of the present invention, computer readable media embodying a program of instructions executable by a computer program performs a method of communications including receiving a feedback parameter relating to a signal transmission, assigning a probability value to one or more of a plurality of parameter values as a function of the feedback parameter, selecting one of the parameter values as a function of the probability value assignments, and controlling the signal transmission as a function of the selected one of the parameter values.

In yet another aspect of the present invention, a communications apparatus includes a transceiver having a transmitter configured to generate a signal transmission and a receiver configured to receive a feedback parameter relating to the signal transmission, and a processor configured to assign a probability value to one or more of a plurality of parameter values as a function of the feedback parameter, select one of the parameter values as a function of the probability value assignments, and control the signal transmission generated by the transmitter as a function of the selected one of the parameter values.

In a further aspect of the present invention, a communications apparatus includes means for receiving a feedback parameter relating to a signal transmission, means for assigning a probability value to one or more of a plurality of parameter values as a function of the feedback parameter, means for selecting one of the parameter values as a function of the probability value assignments, and means for controlling the signal transmission as a function of the selected one of the parameter values.

It is understood that other embodiments of the present invention will become readily apparent to those skilled in the art from the following detailed description, wherein it is shown and described only exemplary embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention.

Figure 1:
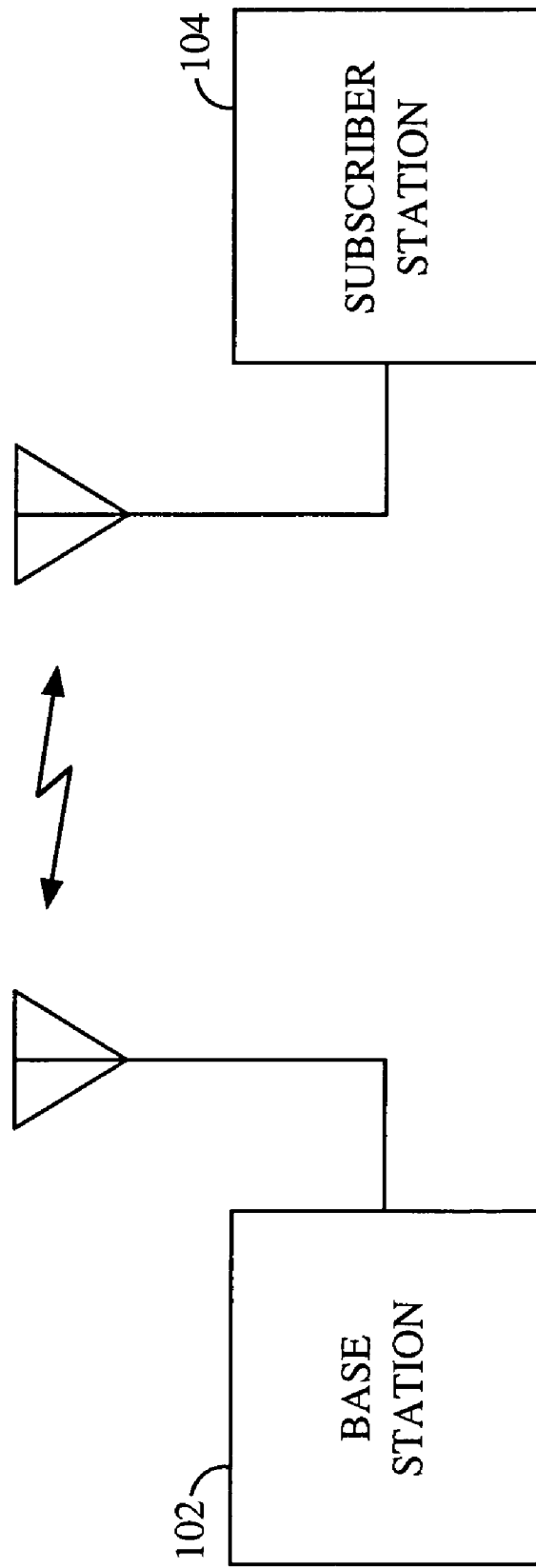
FIG. 1 is a conceptual block diagram showing a base station in communication with a subscriber station in an exemplary communications system.

FIG. 1 is a conceptual block diagram showing a base station 102 in communication with a subscriber station 104 in an exemplary wireless communications system. The subscriber station 104 may access a network (not shown), or communicate with other subscriber stations (not shown), through the base station 102. The base station 102 can be implemented with a variable data rate to ensure the transmission occurs near or at the maximum data rate that supports the minimum quality of service requirements. Initially, communications are established between the base station 102 and the subscriber station 104 using a predetermined access procedure. Once communications are established, the subscriber station 104 can receive traffic and control messages from the base station 102 over a forward link, and is able to transmit traffic and control messages to the base station 102 over a reverse link. The forward link refers to transmissions from the base station 102 to the subscriber station 104, and the reverse link refers to transmissions from the subscriber station 104 to the base station 102.

The subscriber station 104 can provide feedback to the base station 102 over the reverse link to optimize performance. The feedback can be in the form of a parameter estimated at the subscriber station 104 and fed back to the base station 102 to control the forward link transmission. The parameter should relate to the quality of the forward link transmission under existing channel conditions. The C/I ratio is just one example of such a parameter. In at least one embodiment of the communications system, an estimate of the C/I ratio is fed back to the base station 102 to efficiently control the data rate of the forward link transmission. An estimate of the C/I ratio can be computed at the subscriber station from a pilot signal transmitted over the forward link. Since the pilot signal is known, a priori, an estimate of the C/I ratio can be computed from a locally generated replica of the pilot signal stored in memory (not shown) at the subscriber station 102.

Figure 2:
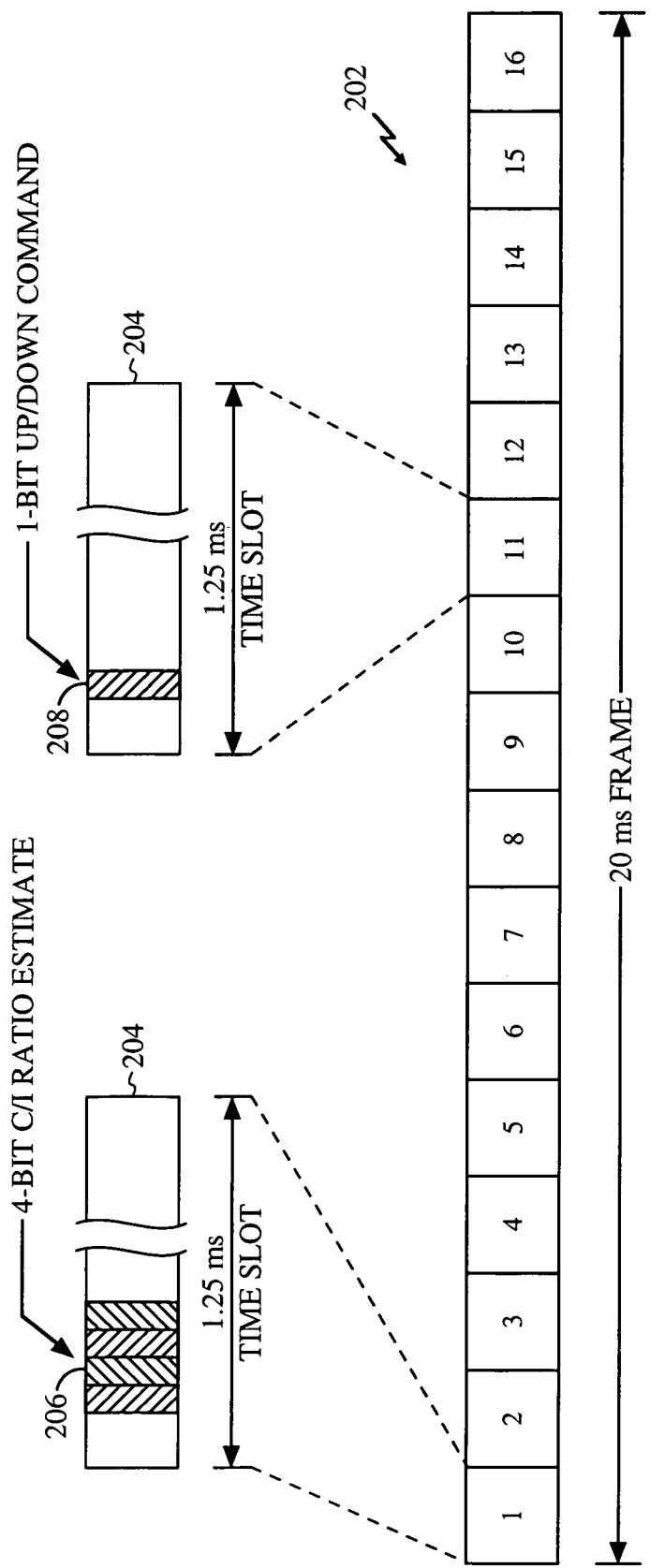
FIG. 2 is an exemplary signal format used for the reverse link transmission carrying a C/I ratio estimate from the subscriber station to the base station.

An exemplary signal format used for a reverse link transmission carrying an estimated C/I ratio is shown in FIG. 2. The waveform can be partitioned into 20 millisecond (ms) frames 202 with each frame having sixteen 1.25 ms time slots 204. For ease of explanation, the estimated C/I ratio is shown having its own control channel referred to hereinafter as the Reverse Channel Quality Indicator Channel (R-CQICH). However, as those skilled in the art will readily appreciate, the estimated C/I ratio can be transmitted over the reverse link in any manner depending on the communications environment, applicable industry standards, and overall design constraints. For example, the estimated C/I ratio can be punctured into one or more traffic channels. Alternatively, the estimated C/I ratio can be time division multiplexed with other overhead signals such as the reverse link pilot signal.

A C/I ratio estimate can be performed in every time slot at the subscriber station and fed back to the base station in any manner. Alternatively, a differential encoding scheme may be used in order to exploit the possible correlation between subsequent C/I ratio estimates. The differences between the C/I ratio estimates for subsequent time slots can be mapped into a one-bit value at the subscriber station and then sent over the reverse link to the base station. The base station can then accumulate all received differential values to obtain a C/I ratio value. To maintain the stability of the feedback loop in the presence of potential differential decoding errors, the subscriber station may also send periodic full C/I ratio estimates. In the described exemplary embodiment, the full C/I ratio estimate 206 is mapped into four-bits and sent in one time slot followed by a differential value 208 in each of the following fifteen time slots. However, as those skilled in the art will appreciate, the full C/I ratio estimate can be mapped into any number of bits and be sent as often as desired depending on the specific application and the overall design constraints.

The differential encoding scheme has the added benefit of reducing overall power since transmitting one-bit requires significantly less power than the transmission of four-bits with the same target bit error rate. In addition, base station decoding errors in the differential values have less adverse effects, since they can only offset the C/I ratio by twice the differential step size, while base station decoding errors of the full C/I ratio estimates can cause offsets as large as the full dynamic range of the C/I ratio. To reduce base station decoding errors of the full C/I ratio estimates, the same C/I ratio estimate may be transmitted in two or more consecutive time slots over the reverse link. The number of time slots used to carry the same full C/I ratio estimate will be referred to herein as the repetition rate of the full C/I ratio estimate. For example, a R-CQICH having the same full C/I ratio estimate transmitted over four time slots is said to have a repetition rate of 4.

The full C/I ratio estimate can be mapped into a binary sequence at the subscriber station and fed back to the base station. An exemplary mapping algorithm is shown in Table 1 below with a four-bit binary sequence and a quantizer step size of 1.5dB.

TABLE 1

| Full C/I ratio estimate in dB | Mapped Full C/I ratio estimate (binary) |
|---|---|
| Below −15.5 (or Subscriber Station not ready) | '0000' |
| −15.5 to −14.0 | '0001' |
| −14.0 to −12.5 | '0010' |
| −12.5 to −11.0 | '0011' |
| −11.0 to −9.5 | '0100' |
| −9.5 to −8.0 | '0101' |
| −8.0 to −6.5 | '0110' |
| −6.5 to −5.0 | '0111' |
| −5.0 to −3.5 | '1000' |
| −3.5 to −2.0 | '1001' |
| −2.0 to −0.5 | '1010' |
| −0.5 to 1.0 | '1011' |
| 1.0 to 2.5 | '1100' |
| 2.5 to 4.0 | '1101' |
| 4.0 to 5.5 | '1110' |
| Above 5.5 | '1111' |

At the base station, the four-bit binary sequence can be demapped into one of 16 possible quantized full C/I ratio values as shown in Table 2 below.

TABLE 2

| Mapped Full C/I ratio estimate (binary) | Quantized Full C/I ratio values (dB) |
|---|---|
| '0000' | −16.25 |
| '0001' | −14.75 |
| '0010' | −13.25 |
| '0011' | −11.75 |
| '0100' | −10.25 |

TABLE 2-continued

| Mapped Full C/I ratio estimate (binary) | Quantized Full C/I ratio values (dB) |
|---|---|
| '0101' | −8.75 |
| '0110' | −7.25 |
| '0111' | −5.75 |
| '1000' | −4.25 |
| '1001' | −2.75 |
| '1010' | −1.25 |
| '1011' | 0.25 |
| '1100' | 1.75 |
| '1101' | 3.25 |
| '1110' | 4.75 |
| '1111' | 6.25 |

The quantized full C/I ratio value can then be adjusted during each subsequent time slot depending on the differential value. The differential step size can be any size depending on the particular design parameters. Moreover, the step size can be fixed or adaptive. An adaptive step size may provide some improvement in performance under varying channel conditions but will undoubtedly increase the complexity of the system. In at least one exemplary embodiment of a wireless communications system using the mapping algorithm in Table 1, the differential step size is set to 0.5 dB requiring 46 different C/I ratio values at the base station to cover the entire dynamic range, i.e., −16.25 dB to 6.25 dB. In alternative embodiments with different quantizer and differential step sizes, the number N of required C/I ratio values can be determined by the following equation:

$$N = b(n-1) + 1 \quad (1)$$

where n=the number of quantized full C/I ratio values; and
b=the quantizer step size divided by the differential step size.

Figure 3:
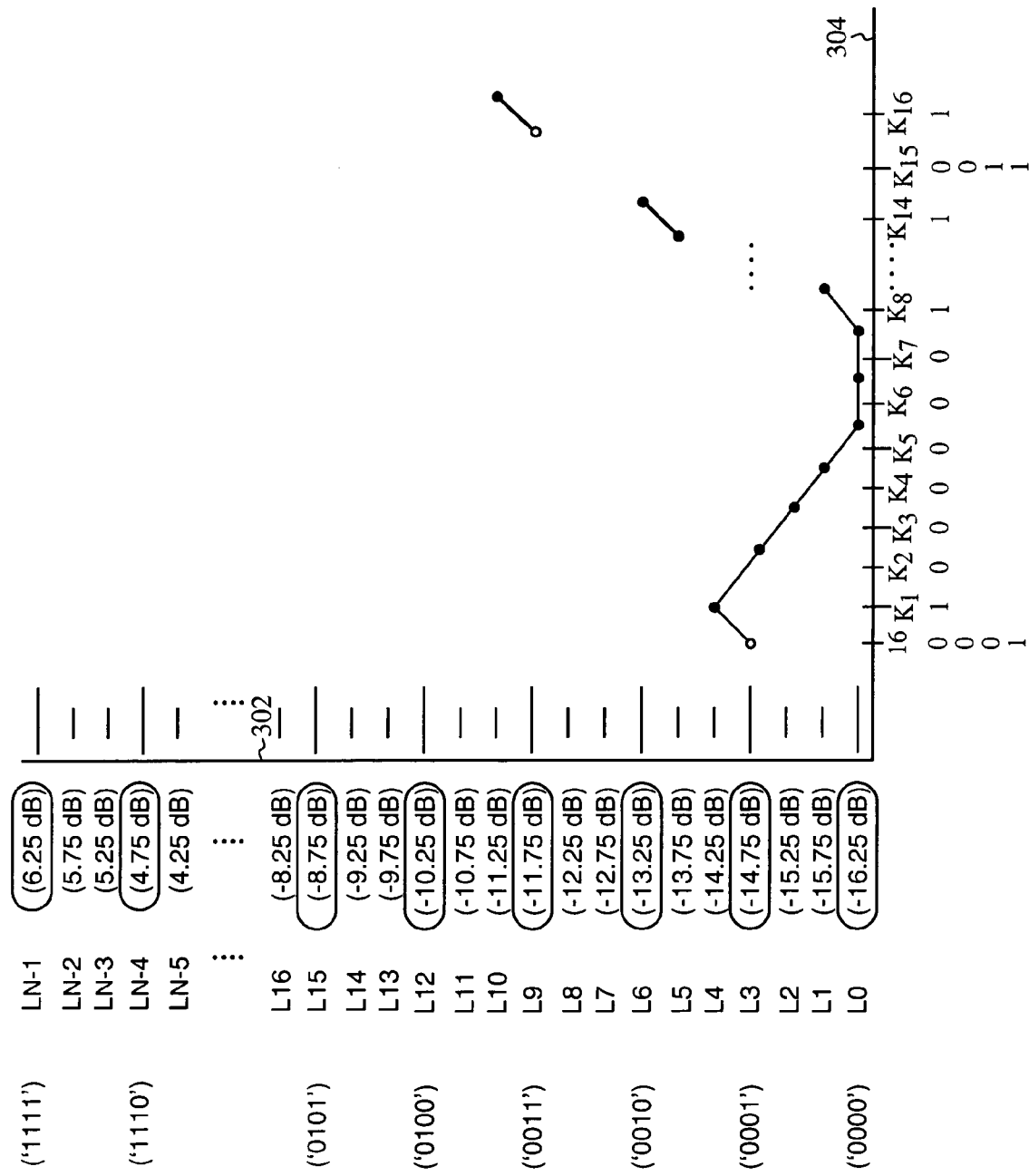
FIG. 3 is a graphical representation illustrating an exemplary differential encoding scheme for a C/I ratio estimate.

FIG. 3 is a graphical representation illustrating the manner in which the differential encoding scheme can be used to control the C/I ratio values computed at the base station. For the purposes of explanation, the mapping algorithm shown in Table 2 with a quantizer step size of 1.5 dB and a differential step size of 0.5 dB will be used. Since the differential step size (0.5 dB) is exactly one-third of the quantizer step size (1.5 dB), and since there are 16 possible quantized full C/I ratio values, then equation (1) can be used to compute the number of C/I ratio values (N=46). The 46 C/I ratio values are shown on the vertical axis 302 in FIG. 3 as levels $L_0$–$L_{N-1}$. The quantized full C/I ratio values are encircled with their respective binary mapping sequence from Table 2 to the immediate left. The horizontal axis 304 in FIG. 3 represents time. Along the horizontal axis 304 is shown an exemplary R-CQICH sequence with a differential value of "1" representing an up command and a differential value "0" representing a down command. The full C/I ratio estimates on the R-CQICH are represented with empty circles, while the differential values on the R-CQICH are represented with solid circles.

At time $k_0$, a full C/I ratio estimate comprising a four-bit sequence "0001" is transmitted over the R-CQICH from the subscriber station to the base station. A quantized full C/I ratio value at $L_3$ (−14.75 dB) is selected by the base station in response to the four-bit sequence. In the following time slot at $k_1$, an up command "1" is transmitted over the R-CQICH from the subscriber station to the base station. In response to the up command, the base station increases the C/I ratio value to $L_4$ (−14.25 dB). Next, a down command "0" is transmitted over the R-CQICH from the subscriber station to the base station at time $k_2$, causing the base station to decrease the C/I ratio value back to $L_3$ (−14.75 dB). The base station continues to adjust the C/I ratio value in 0.5 dB increments in response to the differential values transmitted in each time slot as shown in FIG. 3 until a full C/I ratio estimate is received by the base station at time $k_{15}$. As shown in FIG. 3, at time $k_{15}$, the base station adjusts the C/I ratio value from $L_6$ (−13.25 dB) to $L_9$ (−11.75 dB) in response to a full C/I ratio estimate comprising a four-bit sequence "0011."

Figure 4:
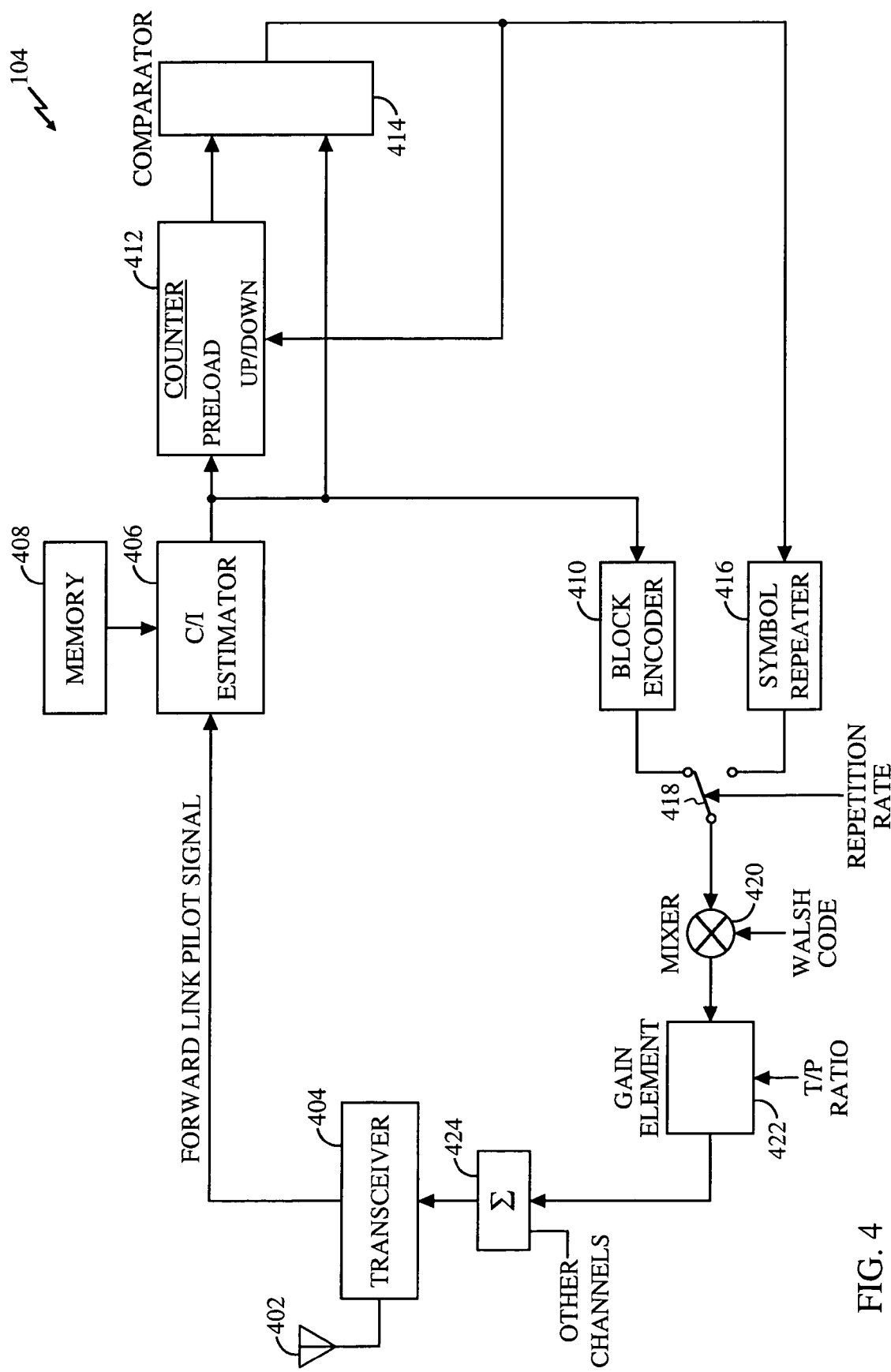
FIG. 4. is a functional block diagram of an exemplary subscriber station.

FIG. 4 is a functional block diagram of the exemplary subscriber station described in connection with FIG. 1. The subscriber station 104 typically includes an antenna 402 which couples the forward link transmission from the base station (not shown) to a transceiver 404. The transceiver 404 can be configured to filter, amplify, downconvert and demodulate the forward link transmission. The forward link pilot signal can then be extracted from the output of the transceiver and provided to a C/I ratio estimator 406. Since the forward link pilot signal is known, a priori, a replica can be stored in memory 408 at the subscriber station 4. Based on the forward link pilot signal and its replica, the C/I ratio estimator 406 can compute an estimated C/I ratio by any means known in the art including a mean square error (MSE) algorithm or any other applicable algorithm. The estimated C/I ratio can then be mapped into a binary sequence using Table 1 or any other mapping algorithm.

The binary sequence from the C/I estimator 406 can be provided to a block encoder 410. In at least one exemplary embodiment, a four-bit binary sequence derived from the mapping algorithm of Table 1 can be encoded with a (12,4) code word. This code word can be obtained by truncating the first four bits of a 16×16 Walsh code. The resulting code words are listed in Table 3. Each row in Table 3 represents one of the 16 possible code words and of the values shown in the second column of Table 1.

TABLE 3

| 0 | 0 | 0 | 0 | 0 | 0 | 0 | 0 | 0 | 0 | 0 | 0 |
|---|---|---|---|---|---|---|---|---|---|---|---|
| 0 | 1 | 0 | 1 | 0 | 1 | 0 | 1 | 0 | 1 | 0 | 1 |
| 0 | 0 | 1 | 1 | 0 | 0 | 1 | 1 | 0 | 0 | 1 | 1 |
| 0 | 1 | 1 | 0 | 0 | 1 | 1 | 0 | 0 | 1 | 1 | 0 |
| 1 | 1 | 1 | 1 | 0 | 0 | 0 | 0 | 1 | 1 | 1 | 1 |
| 1 | 0 | 1 | 0 | 0 | 1 | 0 | 1 | 1 | 0 | 1 | 0 |
| 1 | 1 | 0 | 0 | 0 | 1 | 1 | 1 | 1 | 0 | 0 | 0 |
| 1 | 0 | 0 | 1 | 0 | 1 | 1 | 0 | 1 | 0 | 0 | 1 |
| 0 | 0 | 0 | 0 | 1 | 1 | 1 | 1 | 1 | 1 | 1 | 1 |
| 0 | 1 | 0 | 1 | 1 | 0 | 1 | 0 | 1 | 0 | 1 | 0 |
| 0 | 0 | 1 | 1 | 1 | 1 | 0 | 0 | 1 | 1 | 0 | 0 |
| 0 | 1 | 1 | 0 | 1 | 0 | 0 | 1 | 1 | 0 | 0 | 1 |
| 1 | 1 | 1 | 1 | 1 | 1 | 1 | 1 | 0 | 0 | 0 | 0 |
| 1 | 0 | 1 | 0 | 1 | 0 | 1 | 0 | 0 | 1 | 0 | 1 |
| 1 | 1 | 0 | 0 | 1 | 1 | 0 | 0 | 0 | 0 | 1 | 1 |
| 1 | 0 | 0 | 1 | 1 | 0 | 0 | 1 | 0 | 1 | 1 | 0 |

All Code Words of the (12, 4) Codebook as Row Vectors

Because the code words are not truly orthogonal, the cross-correlation values shown in Table 4 result. Element $c_{i,j}$ situated in row i and column j of Table 4 represents the cross-correlation between row i and column j of Table 3, where the values are normalized so that the norm of every code word in Table 3 is 1.

TABLE 4

| 1 | 0 | 0 | 0 | −0.33 | 0 | 0 | 0 | −0.33 | 0 | 0 | 0 | −0.33 | 0 | 0 | 0 |
|---|---|---|---|---|---|---|---|---|---|---|---|---|---|---|---|
| 0 | 1 | 0 | 0 | 0 | −0.33 | 0 | 0 | 0 | −0.33 | 0 | 0 | 0 | −0.33 | 0 | 0 |
| 0 | 0 | 1 | 0 | 0 | 0 | −0.33 | 0 | 0 | 0 | −0.33 | 0 | 0 | 0 | −0.33 | 0 |
| 0 | 0 | 0 | 1 | 0 | 0 | 0 | −0.33 | 0 | 0 | 0 | −0.33 | 0 | 0 | 0 | −0.33 |
| −0.33 | 0 | 0 | 0 | 1 | 0 | 0 | 0 | −0.33 | 0 | 0 | 0 | −0.33 | 0 | 0 | 0 |
| 0 | −0.33 | 0 | 0 | 0 | 1 | 0 | 0 | 0 | −0.33 | 0 | 0 | 0 | −0.33 | 0 | 0 |
| 0 | 0 | −0.33 | 0 | 0 | 0 | 1 | 0 | 0 | 0 | −0.33 | 0 | 0 | 0 | −0.33 | 0 |
| 0 | 0 | 0 | −0.33 | 0 | 0 | 0 | 1 | 0 | 0 | 0 | −0.33 | 0 | 0 | 0 | −0.33 |
| −0.33 | 0 | 0 | 0 | −0.33 | 0 | 0 | 0 | 1 | 0 | 0 | 0 | −0.33 | 0 | 0 | 0 |
| 0 | −0.33 | 0 | 0 | 0 | −0.33 | 0 | 0 | 0 | 1 | 0 | 0 | 0 | −0.33 | 0 | 0 |
| 0 | 0 | −0.33 | 0 | 0 | 0 | −0.33 | 0 | 0 | 0 | 1 | 0 | 0 | 0 | −0.33 | 0 |
| 0 | 0 | 0 | −0.33 | 0 | 0 | 0 | −0.33 | 0 | 0 | 0 | 1 | 0 | 0 | 0 | −0.33 |
| −0.33 | 0 | 0 | 0 | −0.33 | 0 | 0 | 0 | −0.33 | 0 | 0 | 0 | 1 | 0 | 0 | 0 |
| 0 | −0.33 | 0 | 0 | 0 | −0.33 | 0 | 0 | 0 | −0.33 | 0 | 0 | 0 | 1 | 0 | 0 |
| 0 | 0 | −0.33 | 0 | 0 | 0 | −0.33 | 0 | 0 | 0 | −0.33 | 0 | 0 | 0 | 1 | 0 |
| 0 | 0 | 0 | −0.33 | 0 | 0 | 0 | −0.33 | 0 | 0 | 0 | −0.33 | 0 | 0 | 0 | 1 |

Cross-Correlation Values of the (12,4) Codebook

In a manner to be described in greater detail later, the cross-correlation values of the code words can be used to compute the C/I ratio value at the base station. Because of the cyclic nature, the cross-correlation values shown in Table 4, $c_{i,j}$ can be computed, which makes it unnecessary to store Table 4 at the base station. For example, $c_{i,j}$ could be determined according to the following equation:

$$c_{i,j} = \begin{cases} 1 & \text{if } i = j \\ -1/3 & \text{if } i \neq j \text{ and } i - j \equiv 0 (\text{mod} 4) \\ 0 & \text{otherwise,} \end{cases} \quad 1 \leq i, j \leq 16, \quad (2)$$

Whether to utilize Table 4 or equation (2) in order to obtain the cross-correlation values $c_{i,j}$, is matter of design choice and can be decided based on which methodology requires less resources in the base station.

In at least one exemplary embodiment of the subscriber station, the differential values are determined not by the differences between subsequent C/I ratio estimates, but by the differences between the current C/I ratio estimate and a number stored in a counter 412. The counter 412 can be preloaded every frame with a number representative of a full C/I ratio estimate. The output of the counter 412 can then be compared to a number representative of a subsequent C/I ratio estimate to determine the differential value. A comparator 414 can be used to a generate a differential value that represents an up command if the subsequent C/I ratio estimate number exceeds the number stored in the counter and a down command if the subsequent C/I ratio estimate number is less than the number stored in the counter. The differential value output from the comparator 414 can be provided to a symbol repeater 416 which, generates 12 redundant symbols for each differential value. The differential value output can also be used to increment or decrement the counter 412.

A switch 418 can be used to switch between the block encoder 410 and the symbol repeater 416. The output of the switch 418 can be used to provide feedback to the base station over the R-CQICH. The R-CQICH includes the 12-symbol codes from the block encoder 410 time division multiplexed with the 12-symbol codes from the symbol repeater 416. The repetition rate for the full C/I ratio estimate is used to control the switch 418. The repetition rate for the full C/I ratio estimate is generated at the base station and signaled to the subscriber station.

Following the switch 418, the R-CQICH can be spread with a Walsh code using a mixer 420 and amplified with a predetermined gain by a gain element 422. The predetermined gain can be computed as a function of a traffic-to-pilot (TIP) ratio, which is also generated at the base station and signaled to the subscriber station. A summer 424 can then be used to combine the R-CQICH with other channels, such as a reverse link pilot channel, before it is modulated, upconverted, amplified and filtered by the transceiver 404 for transmission over the reverse link via the antenna 402.

Figure 5:
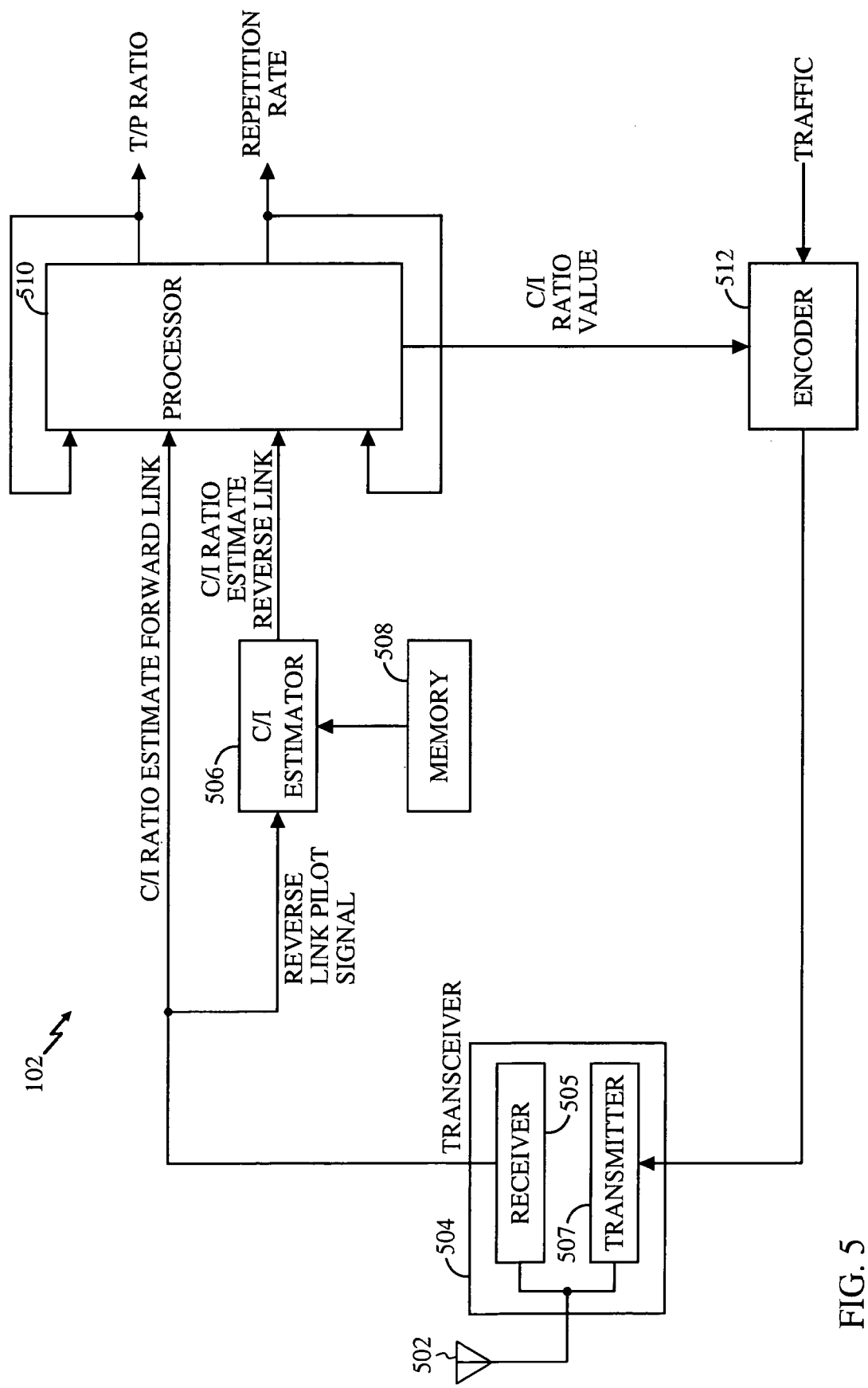
FIG. 5 is a functional block diagram of exemplary base station.

FIG. 5 is a functional block diagram of the exemplary base station described in connection with FIG. 1. The base station 102 typically includes an antenna 502 which couples the reverse link transmission from the subscriber station (not shown) to a transceiver 504. The transceiver 504 includes a receiver 505 and transmitter 507. The receiver 505 can be configured to filter, amplify, downconvert and demodulate the reverse link transmission. The reverse link pilot signal can then be extracted from the output of the receiver 505 and provided to a C/I ratio estimator 506 similar to the one described in connection with the subscriber station of FIG. 4. The C/I ratio estimator 506 can be used to estimate the C/I ratio of the reverse link transmission from the reverse link pilot signal and its replica stored in memory 508. The reverse link C/I ratio estimate ($C/I_{RLpilot}$) and the T/P ratio can be used by a processor 510 to decode the forward link C/I ratio estimate carried by the R-CQICH. In a manner to be described in greater detail later, the T/P ratio and the repetition rate can be adjusted by the processor 510 based on the reliability of the decoding operation.

The processor 510 can be implemented with various decoding algorithms. In at least one exemplary embodiment, the processor 510 can be implemented with a decoding algorithm that determines a C/I ratio value from a probability vector derived from a feedback parameter. The feedback parameter can be any quality indicator such as the C/I ratio estimate. The probability vector comprises a probability value assigned to one or more of the N possible C/I ratio values (see equation 1). Each probability value represents an estimate of the probability that its assigned C/I ratio value is the actual C/I ratio for the forward link transmission. A C/I ratio value can then be selected from the probability vector by selecting the highest possible C/I ratio value that results in a confidence level that the actual C/I ratio is higher than the selected C/I ratio by at least a probability factor δ. A probability factor δ of 85% is expected to produce good results, however, as those skilled in the art will readily appreciate, any probability factor δ can be used depending on the specific application, the expected channel conditions, the overall system requirements, and/or other relevant factors.

The C/I ratio value can be used to control the data rate of an encoder 512. The encoder 512 performs various signal processing functions on one or more traffic channels such as convolutional encoding at the data rate set by the processor 510, and interleaving. The traffic from the encoder 512 can then be provided to the transmitter 507 in the transceiver 504 where it is combined with other overhead channels, modulated, upconverted to a carrier frequency, filtered and amplified before being transmitted over the forward link through the antenna 502.

The Decoding Algorithm

The decoding algorithm is responsible for computing the probability vector and selecting the C/I ratio value from the probability vector. The probability vector may be computed in different ways depending on the overall design constraints of the processor. In at least one exemplary embodiment of the decoding algorithm, the probability vector is determined from a multi-step procedure. First, a full C/I ratio estimate transmitted on the R-CQICH is correlated with each code word from the subscriber station codebook, an example of which is shown in Table 3, to determine the probability values for one or more of the quantized full C/I ratio values n (see equation 1). Then, probability values for subsequent differential values are computed to determine the likely sequence of up and down commands. Next, the probability values are adjusted in each time slot by taking the probability values determined for the most recent full C/I ratio estimate and convolving them with the subsequent differential value probabilities.

To reduce the impact of R-CQICH decoding errors, the decoding algorithm can be further implemented to compute a reliability measure for each full C/I ratio estimate. If the reliability of the full C/I ratio estimate is too low, it can be discarded and the probability values for that time slot computed using a differential value. If a differential value is not transmitted on the R-CQICH with the full C/I ratio estimate, the decoding algorithm can artificially create a differential value. For example, a differential value can be created which represents a 50% probability that the differential value is an up command and a 50% probability that the differential value is a down command. The reliability measure can also be used to control the power of the R-CQICH and the repetition rate of the full C/I estimate to further reduce decoding errors.

1. Probability Values for the Quantized Full C/I Ratio Values

The probability value for one or more of the quantized full C/I ratio values can be determined by correlating the full C/I ratio estimate transmitted on the R-CQICH with each code word from the block encoder in the subscriber station. This can be achieved with n correlators operating in parallel in which the expected output, $m_{i,j}$, of correlator j for code word i is first computed by the following equation:

$$m_{i,j} = \sqrt{C/I_{RLpilot} \cdot T/P_{fullC/I}} \cdot c_{i,j}, \ 1 \leq i,j \leq n, \quad (3)$$

where $T/P_{fullC/I}$ is the traffic-to-pilot ratio for the time slots carrying the full C/I ratio estimate and $c_{i,j}$ comprise the cross-correlation values for the code word, both parameters known to the base station. In the case of a 16×16 truncated Walsh code, the cross-correlation values from Table 4 can be used. Equation (3) further assumes that all signal levels are normalized, so that the measured noise variance is 1.

Next, the actual output of the correlators, $r_j$, and the expected output of the correlators, $m_{i,j}$, can be used with to compute the probability, $f_{i,j}$, of observing $r_j$ at the output of correlator j when the code word i is being received. The values $f_{i,j}$, can be computed by the following equation:

$$f_{i,j} = \begin{cases} 1 & \text{if } i = j \text{ and } r_i > m_{i,i} \\ e^{-\frac{(r_j - m_{i,j})^2}{2}} & \text{otherwise,} \end{cases} \quad 1 \leq i, j \leq n, \quad (4)$$

In computing $f_{i,j}$, uncorrelated Gaussian noise is assumed at the correlator outputs. In the case of a subscriber station employing a 16×16 truncated Walsh code, the correlator noise will not truly be uncorrelated due to the non-orthogonality of the code words. However, any degradation due to correlated noise should not impact the computation because of the estimation errors already existing in determining $m_{i,j}$. Note that if there were no measurement noise, $m_{i,j}$, would be the measured value at the output of correlator j, while receiving code word i.

Next, the values $F_i$ are computed by the following equation:

$$F_i = \prod_{j=1}^{16} f_{i,j}, \quad 1 \leq i \leq n. \quad (5)$$

where $F_i$ is a measure of probability of observing a given set of correlator output values (set of n values) when code word i is being received. Again, in computing $F_i$, uncorrelated Gaussian noise is assumed at the correlator outputs.

The probability value $p_i$ assigned to each of the quantized full C/I ratio values can then be computed with the following equation:

$$p_i = \frac{F_i \cdot G_i}{\sum_{k=1}^{n} F_k \cdot G_k}, \quad 1 \leq i \leq n, \quad (6)$$

where $G_i$ is the known a priori probability of code word i being sent by the subscriber station. The $G_i$ can be determined from collected statistics. It may be useful, for example, to compute $G_i$ based on a first order Markov model. In at least one exemplary embodiment of the decoding algorithm, $G_i = n^{-1}, \forall 1 \leq i \leq n$.

In the case where the subscriber station transmits the same C/I ratio estimate in two or more consecutive time slots over the R-CQICH, the correlator outputs obtained in those time slots can be coherently combined to obtain the $r_j$ values. The reverse link pilot signal can also be coherently combined to obtain the reverse link C/I ratio estimate $C/I_{RLpilot}$.

2. Probability Values for Differential Values

The differential value probabilities can be determined based on a procedure very similar to the one described in connection with section 1 above. For ease of comparison, if a parameter x was used in section 1 for the full C/I ratio value probabilities, then here the analogous parameter for the differential value probabilities will be denoted by x'. The major difference here from the full C/I ratio value probabilities is that the indices i and k can only take on the values "1" or "2," where "1" means an up command and "2" means a down command. Another difference is that the cross-correlation values are given by equation (7) below, instead of equation (2) above, where:

$$c_i' = \begin{cases} 1 & \text{if } i = 1 \\ -1 & \text{if } i = 2, \quad 1 \le i \le 2. \end{cases} \quad (7)$$

First, the expected correlator output $m_i'$ is computed for differential value i with the following equation:

$$m_i' = \sqrt{C/I_{RLpilot} \cdot T/P_{diffC/I}} \cdot c_i', \ 1 \le i \le 2, \quad (8)$$

where $T/P_{diffC/I}$ is the traffic-to-pilot ratio for time slots carrying differential values and $c_i'$ comprise the cross-correlation values for the symbol codes from the symbol repeater in the subscriber station, both parameters known to the base station. Equation (8) also assumes that all signal levels are normalized, so that the measured noise variance is 1.

Next, the values $F_i'$ are computed with the following equation:

$$F_i' = \begin{cases} 1 & \text{if } r' \cdot m_i' > 0 \text{ and } |r'| > |m_i'| \\ e^{-\frac{(r'-m_i')^2}{2}} & \text{otherwise}, \quad 1 \le i \le 2, \end{cases} \quad (9)$$

where r' is the measured output at the correlator, and $F_i'$ is a measure of the probability of observing r' at the output of the correlator, when differential value i is being received. In computing $F_i'$, Gaussian noise is assumed at the correlator output. In contrast to the full C/I ratio value probability computation which uses N correlators, only one correlator is used to compute the differential value probabilities. Note that if there were no measurement noise, then $m_i'$ would be the measured value at the output of the correlator, while receiving differential value i.

The condition $|r'| \le |m_i'|$ in equation (9) is given in order to avoid a bias against large correlator output values when the sign of the correlator output matches the hypothetical differential value sent by the subscriber station. In other words, this means that a correlator output is not necessarily declared unlikely if it exceeds its expected value.

Next, the differential probability values $p_i'$ can be computed with the following equation:

$$p_i' = \frac{F_i' \cdot G_i'}{\sum_{k=1}^{2} F_k' \cdot G_k'}, \quad 1 \le i \le 2, \quad (10)$$

where $G_i'$ is the known a priori probability of a differential value i being sent by the subscriber station. The $G_i'$ can be determined from collected statistics. It may be useful, for example, to compute $G_i'$ based on a first or second order Markov model. In at least one embodiment, $G_i' = \frac{1}{2}, \forall 1 \le i \le 2$.

3. Deriving the Probability Vector

In every time slot, the probabilities of all N possible C/I ratio values can be computed by the decoding algorithm. The notation $P_i(k)$ will be used to denote the probability of the C/I ratio value being at level i ($L_i$) at time k (see FIG. 3). Note that the following equation holds true:

$$\sum_{i=0}^{N-1} P_i(k) = 1, \quad \forall k \quad (11)$$

3.1 Calculating the Probability Vector Based on a Full C/I Ratio Estimate

The probability vector based on a full C/I ratio estimate can be computed with the following equation:

$$P_i(k) = \begin{cases} p_{i/b+1} & \text{if } i \equiv 0 (\text{mod } b) \\ 0 & \text{otherwise}, \quad 0 \le i \le N-1, \end{cases} \quad (12)$$

where the $p_i$ is calculated according to equation (6) in section 1, and b is defined in equation (1).

$P_i(k)$ can be computed in every time slot in which a full C/I ratio estimate is received by the base station. When the same full C/I ratio estimate is transmitted in two or more consecutive time slots, then a different probability vector can be computed for each of those time slots. The R-CQICH can be accumulated over all time slots carrying the same full C/I ratio estimate, up to the current time slot. This should result in a reliability that cumulatively increases in subsequent time slots carrying the same full C/I ratio estimate.

3.2 Calculating the Probability Vector Based on a Differential Value

The probability vector computation based on a differential value uses the probability vector from the previous time slot and the probabilities $p_1'$ and $p_2'$, which are calculated as described in section 2.

The probability vector for the differential value can be calculated as the convolution of the preceding probability vector with the probability values, $p_1'$ and $p_2'$, determined from the differential value. The convolution operation can be formulated as follows:

$$P_i(k+1) = \begin{cases} (P_{N-1}(k) + P_{N-2}(k)) \cdot p_1'(k), & i = N-1 \\ P_{i-1}(k) \cdot p_1'(k) + P_{i+1}(k) \cdot p_2'(k), & 0 < i < N-1 \\ (P_0(k) + P_1(k)) \cdot p_2'(k), & i = 0 \end{cases} \quad (13)$$

where $P_i(k+1)$ is the $i^{th}$ element of the probability vector to be determined for time slot k+1 (i.e. the current time slot), $P_i(k)$ is the $i^{th}$ element of the probability vector for time slot k (i.e. the preceding time slot), $p_1'(k)$ is the probability that the differential value transmitted in time slot k is up command, and $P_2'(k)$ is the probability that the differential value transmitted in time slot k is a down command.

Figure 6:
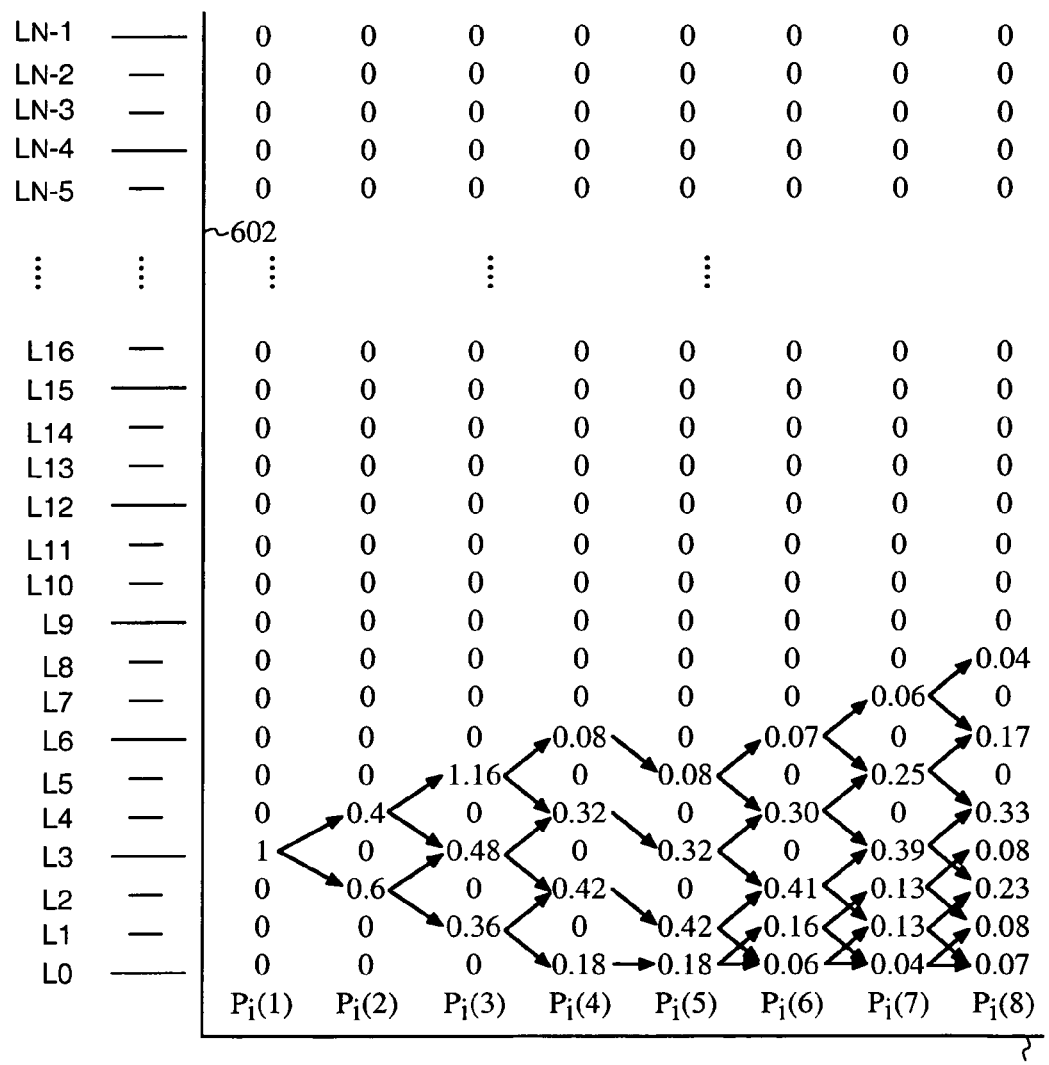
FIG. 6 is a graphical representation illustrating an exemplary convolution operation for generating a probability vector from a C/I ratio estimate.

The manner in which the convolution operation is performed can be well illustrated with reference to FIG. 6. FIG. 6 is similar to FIG. 3 and represents a graphical representation of a convolutional operation for the mapping algorithm shown in Table 2 with a quantizer step size of 1.5 dB and a differential step size of 0.5 dB. The 46 C/I ratio values are shown on the vertical axis 602. The horizontal axis in FIG. 6 represents time. Along the horizontal axis 604 is shown an exemplary sequence of probability values for each consecutive differential value.

For simplicity, the probability vector $p_i(1)$ in the first time slot will include a "1" for the C/I ratio value $L_3$ (−14.75 dB) and "0" for every other possible C/I ratio value. This means that the base station has determined that there is a 100% probability that the full C/I ratio estimate generated by the subscriber station is $L_3$ (−14.75 dB). In reality, this situation will rarely, if ever, occur. Instead, the probabilities will most likely be distributed over many full C/I ratio values. However, the probability vector shown in FIG. 6 is useful for illustrating the convolution concept. In practical applications, each full C/I ratio value with a probability value assigned to it should be convolved, and those skilled in the art will readily understand the convolution operation in these cases from the teachings throughout this disclosure.

Returning to FIG. 6, in the second time slot, the decoding algorithm determines that there is a 40% probability that the differential value is an up command and a 60% probability that the differential value is a down command resulting in differential probability values $p_1'(k)=0.4$ and $p_2'(k)=0.6$. These differential probability values can be convolved with the full C/I ratio estimate $L_3$ (−14.75 dB) to obtain a 40% probability that the C/I ratio is $L_4$ (−14.25 dB) and a 60% probability that the C/I ratio is $L_2$ (−15.25 dB) as shown by the probability vector $p_t(2)$ for the second time slot in FIG. 6.

In the third time slot, the decoding algorithm again determines that there is a 40% probability that the differential value is an up command and a 60% probability that the differential value is a down command resulting in differential probability values $p_1'(k)=0.4$ and $p_2'(k)=0.6$. These differential probability values can be convolved with the probability vector $p_t(2)$ from the previous time slot, to obtain a 16% probability that the C/I ratio is $L_5$ (−13.75 dB) and a 36% probability that the C/I ratio is $L_1$ (−15.75 dB) as shown by the probability vector $p_t(3)$ for the second time slot in FIG. 6. The convolution operation also results in a 48% probability that the C/I ratio is $L_3$ (−14.75 dB). The 48% probability is derived from two components. The first component is derived from the 40% probability value assigned to $L_4$ (−14.25 dB) from the previous time slot and the 60% probability that the differential value for the current time slot is a down command. The second component is derived from the 60% probability value assigned to $L_2$ (−15.25 dB) from the previous time slot and the 40% probability that the differential value for the current time slot is an up command. The probability value for $L_3$ (−14.75 dB) can then be obtained from the sum of the first component 0.24 (0.40×0.60) and the second component 0.24 (0.60×0.40) which equals 0.48.

The probability vector for each of the remaining time slots can be computed in a similar manner from the differential value probabilities that follow. As one can readily see, the probability value assignments for the probability vector remain tightly cluttered around a single C/I ratio value when the differential values are decoded with a relatively high level of confidence. On the other hand, the probability values tend to be widely scattered about when there is a high level of uncertainty as to the decoding accuracy of the differential values.

4. Deriving a C/I Ratio Value from the Probability Vector

To select a C/I ratio value from the probability vector, a function $f(\underline{x})$ acting on a vector of N elements can be used, such that:

$$\left(\frac{C}{I}\right)(k) = f(P_0(k), P_1(k), \ldots, P_{N-1}(k)), \tag{14}$$

where $$\left(\frac{C}{I}\right)(k)$$

is the selected C/I ratio value in time slot k.

The following function can be restated as $f(\underline{x}):f(x_0, x_1, \ldots, x_{N-1})=L_u$, where u is the greatest integer in the set $S=\{0,1,\ldots,N-1\}$ which satisfies the following equation:

$$\sum_{i=u}^{N-1} x_i \geq \delta \tag{15}$$

where $\delta$ is a prescribed confidence level, and $L_u$ is the $u^{th}$ C/I ratio value read from the vertical axis, 302, in FIG. 3. In other words, a C/I ratio value can be selected from the probability vector by selecting the highest possible C/I ratio value that results in a confidence level that the actual C/I ratio is higher than the selected C/I ratio by at least a probability factor $\delta$. A probability factor $\delta$ of 85% is expected to produce good results, however, as those skilled in the art will readily appreciate, any probability factor $\delta$ can be used depending on the specific application, the expected channel conditions, the overall system requirements, and/or other relevant factors.

Figure 7:
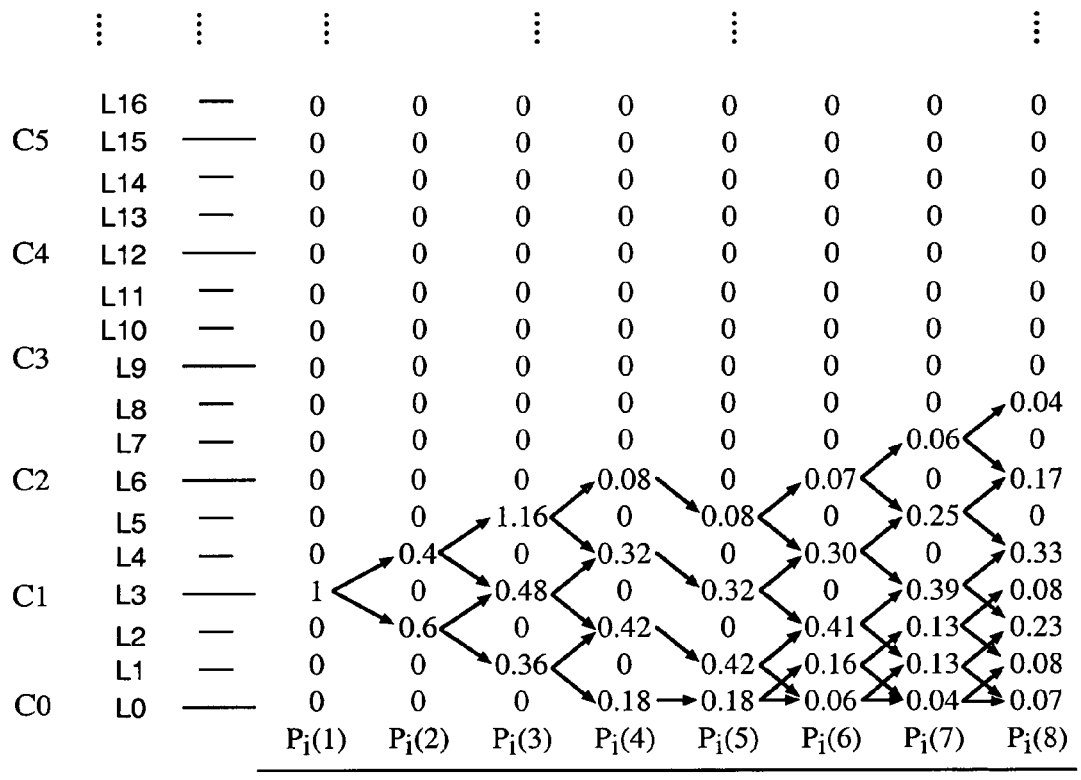
FIG. 7 is a reproduction of FIG. 6 showing a decoded C/I ratio estimate for each time slot based on a probability factor of 85%.

FIG. 7 is a reproduction of FIG. 6 showing at the bottom of the figure for each time slot, the C/I ratio values selected based on a probability factor of 85%. The manner in which the C/I ratio value is selected can be well illustrated by examining the probability value assignments for the probability vector $p_t(8)$ for the eighth time slot. From the probability assignments, one can readily see that the probability that the actual C/I ratio is at least $L_8$ (−12.25 dB) is 4%. The probability that the actual C/I ratio is at least $L_7$ (−12.75 dB) is also 4% (i.e., 0.04+0). The probability that the actual C/I ratio is at least $L_6$ (−13.25 dB) is 21% (i.e., 0.04+0+0.17). Extending this analysis through the probability values, it can be seen that the probability that the actual C/I ratio is equal to or higher than a given C/I ratio value increases from 62% for $L_3$ (−14.75 dB) to 85% for $L_2$ (−15.25 dB). Accordingly, the C/I ratio value at $L_2$ (−15.25 dB) is selected as the C/I ratio value because it is the highest C/I ratio value that has at least an 85% probability that it is equal to or below the actual C/I ratio.

5. Erasure Determination of a Full Ratio C/I Estimate

In at least one exemplary embodiment of the decoding algorithm, the differential value probabilities can be computed in every time slot including those time slots in which a full C/I ratio estimate is transmitted over the R-CQICH. This means that in those time slots, two different probability vectors are available, the first is based on the full C/I ratio estimate while the second is based on the differential value probabilities. In this case, the decoding algorithm can be configured to determine which probability vector to use in selecting the C/I ratio value. The algorithm compares the reliability associated with the two different probability vectors. The algorithm in effect may decide to declare an erasure of the full C/I ratio estimate and ignore it in favor of using the differential value probabilities. If a differential value is not transmitted on the R-CQICH with the full C/I ratio estimate, the decoding algorithm can artificially create a differential value. For example, a differential value can be created which represents a 50% probability that the differential value is an up command and a 50% probability that the differential value is a down command.

The exemplary decoding algorithm may also be configured to deal with full C/I ratio estimates carried in two or more consecutive time slots over the R-CQICH. As discussed earlier, the probability vector based on the full C/I ratio estimate can be calculated in each time slot in which the same full C/I ratio estimate is transmitted. Since the probability vector is calculated based on cumulatively increasing signal energy, the reliability associated with the probability vector should also be increasing. The decoding algorithm can be adaptive such that the probability vector is calculated using the full C/I ratio estimate after the first time slot in which the reliability exceeds that of the differential value probabilities. This may occur before the last slot carrying the same full C/I ratio estimate is received by the base station.

The exemplary decoding algorithm computes and compares a reliability measure of the probability vectors. The reliability measure R(k) can be calculated from the following equation:

$$R(k) = \frac{\sum_{i=0}^{N-1} P_i(k) \cdot (i - M(k))^2}{g(M(k))}, \quad (16)$$

where M(k) is the mean, calculated as:

$$M(k) = \sum_{i=0}^{N-1} i \cdot P_i(k), \quad (17)$$

and g(x), for the special case of N=46, is defined as:

$$g(x) = x^2 - 45 \cdot x + \frac{45.19^2}{3}. \quad (18)$$

The numerator in equation (16) is proportional to the variance of the probability vector, while the denominator is a correction factor used in order to compensate for the edge effects in the variance calculation. Note that the application of the correction factor g(x) may have a different impact on the accuracy of the computation depending on the probability distributions, and therefore, one skilled in the art may chose to modify or eliminate this correction factor from the equation (16). Note also that higher values of R(k) represent a lower reliability for the probability vector.

6. Dynamic Adjustment of the T/P Ratio and Repetition Rate

As explained earlier, the T/P ratio and the repetition rate for the full C/I ratio estimate can be generated at the base station and signaled to the subscriber station. The range of the T/P ratio and the different repetition rates can be varied from system to system depending on a variety of factors including the specific application and the overall design constraints. For the purposes of explanation, an exemplary communications system will be described with a T/P ratio that can be set within a range of −3 dB to +4 dB in ⅛ dB steps and a repetition rate that can be set to 1, 2 or 4.

In the exemplary decoding algorithm, the T/P ratio and repetition rate can be based on a reliability measure determined for every full C/I ratio estimate. For R-CQICH transmissions with the same full C/I ratio estimate in two or more consecutive time slots, the reliability measure can be computed for the last time slot based on the total accumulated energy. The reliability measure values can be low pass filtered, and based on the filtered value, the T/P ratio and/or the repetition rate can be adjusted if necessary. The reliability measure, S(k), can be determined from the following equation:

$$S(k) = \frac{\max_i \{P_i(k)\}}{1 - \max_i \{P_i(k)\}}, \quad (20)$$

where $\max_i\{P_i(k)\}$ is the biggest value in the set $\{P_0(k), P_1(k), \ldots, P_{N-1}(k)\}$, and $P_i(k)$ is computed as explained in section 3.

The low-pass filter, mentioned above, can be a single-pole IIR with a transfer function described by:

$$H(z) = \frac{1 - \alpha}{1 - \alpha z^{-1}}, \quad (21)$$

where α equals 0.99 or any other value as determined by one of ordinary skill in the art. The selected value for α is a result of a trade-off between making the adjustment more responsive and reducing the messaging needed to carry out the adjustment.

Figure 8:
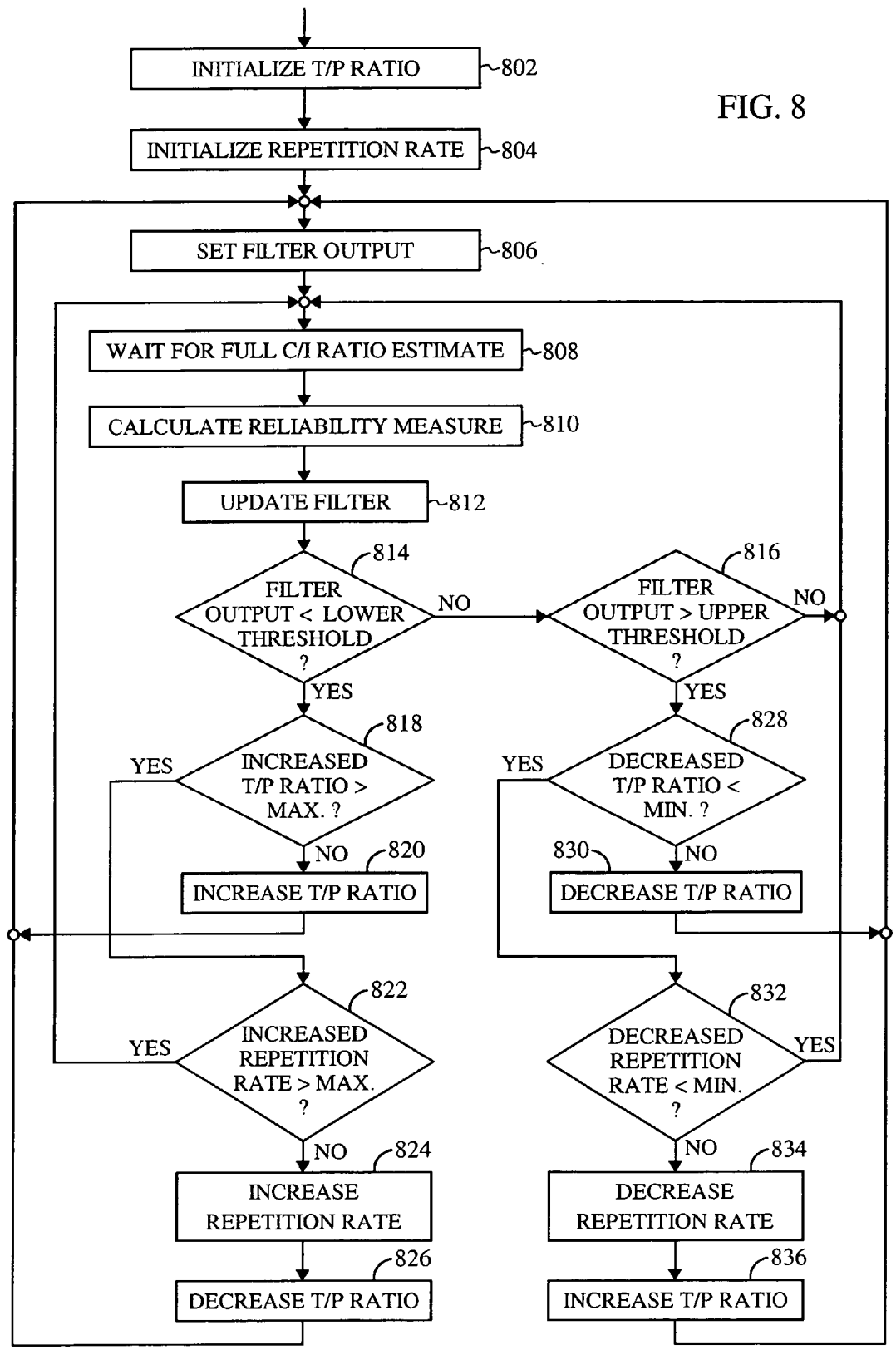
FIG. 8 is a flow diagram illustrating an exemplary algorithm for computing the reliability of the probability vectors at the base station and adjusting the reverse link traffic-to-pilot ratio and repetition rate used for the estimated C/I ratio.

FIG. 8 is a flow diagram illustrating the manner in which the decoding algorithm can dynamically adjust the T/P ratio and the repetition rate for the full C/I ratio estimate. The following illustration of the decoding algorithm is intended as a description of an exemplary embodiment and is not intended to represent the only way in which the T/P ratio and repetition rate for the full C/I ratio estimate can be adjusted.

Referring to FIG. 8, the decoding algorithm sets the T/P ratio to an initial value in step 802, and sets the repetition rate to an initial value in step 804. Next, the filter output is set half-way between the upper and lower threshold in step 806. Once the decoding algorithm sets the initial values, it monitors the R-CQICH until a full C/I ratio estimate is detected in step 808. In step 810, a reliability measure is calculated using equation (20). Then, in step 812, the low-pass filter described by equation (21) is updated based on the reliability measure calculated in step 810. Next, the decoding algorithm determines whether the filter output is within the upper and lower threshold. If the decoding algorithm determines that the filter output is greater than the minimum threshold in step 814 and lower than the maximum threshold in step 816, then no adjustment is made to the T/P ratio or the repetition rate for the full C/I ratio estimate, and the decoding algorithm loops back to step 808 to await the next full C/I ratio estimate.

Returning to step 814, if the decoding algorithm determines that the filter output is less than the lower threshold, then a determination is made as to whether an increase in the T/P ratio can be made without exceeding the maximum allowable T/P ratio in step 818. If it is determined that the T/P ratio can be increased without exceeding the maximum allowable T/P ratio, then the T/P ratio is increased in step 820. The decoding algorithm then loops back to step 808 to await the next full C/I ratio estimate. On the other hand, if it is determined that the T/P ratio cannot be increased any further, then a determination is made as to whether the repetition rate can be increased without exceeding the maximum allowable repetition rate in step 822. If it is determined that the repetition rate can be increased without exceeding the maximum allowable repetition rate, then the repetition rate is increased in step 824, and the T/P ratio is reduced in step 826. Once the T/P ratio is reduced in step 826, or it is determined by the decoding algorithm in step 822 that the repetition rate cannot be increased any further, the decoding algorithm loops back to step 808 to await the next full C/I ratio estimate.

Returning to step 816, if the decoding algorithm determines that the filter output is greater than the upper threshold, then a determination is made as to whether an decrease in the T/P ratio could be made without dropping below the minimum allowable T/P ratio in step 828. If it is determined that the T/P ratio can be decreased without dropping below the minimum allowable T/P ratio, then the T/P ratio is decreased in step 830. The decoding algorithm then loops back to step 808 to await the next full C/I ratio estimate. On the other hand, if it is determined that the T/P ratio cannot be decreased any further, then a determination is made as to whether the repetition rate can be decreased without dropping below the minimum allowable repetition rate in step 832. If it is determined that the repetition rate can be decreased without dropping below the minimum allowable repetition rate, then the repetition rate is decreased in step 834, and the T/P ratio is increased in step 836. Once the T/P ratio is increased in step 836, or it is determined by the decoding algorithm in step 832 that the repetition rate cannot be decreased any further, the decoding algorithm loops back to step 808 to await the next full C/I ratio estimate.

Although the decoding algorithm has been described by a process which first attempts to adjust the T/P ratio before adjusting the repetition rate, those skilled in the art will appreciate that the order could reversed, or alternatively, performed in parallel. In fact, the procedures described in connection with the decoding algorithm can be performed in various different orders, either serially, in parallel, or any combination of serial and parallel operations. Moreover, one or more of the procedures may be omitted or combined with other techniques known in the art.

7. Exemplary Implementation of a Decoding algorithm

Figure 9:
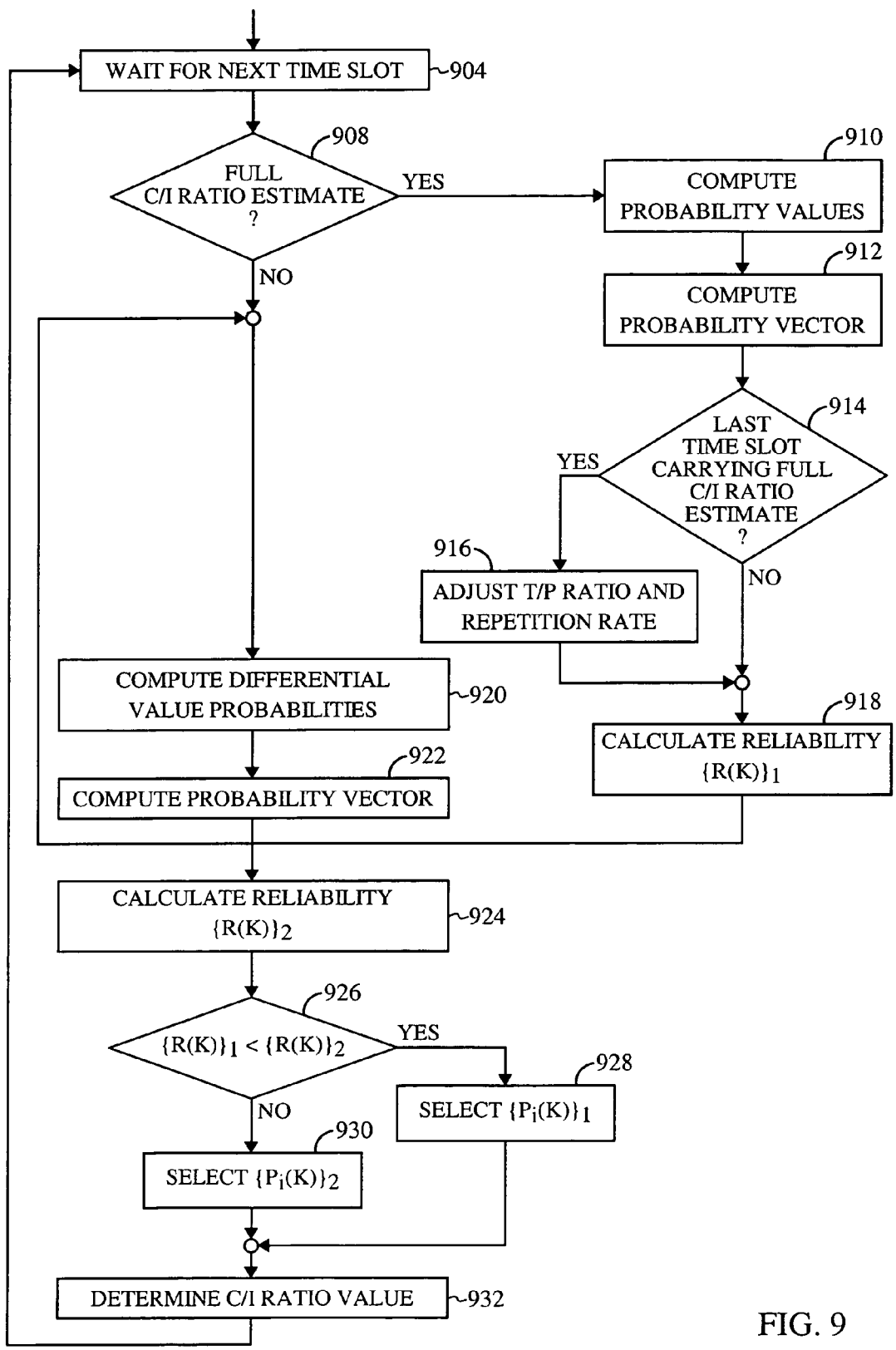
FIG. 9 is a flow diagram illustrating an exemplary algorithm for decoding a C/I ratio estimate.

FIG. 9 is a flow diagram illustrating an exemplary decoding algorithm. The decoding algorithm described in connection with FIG. 9 is intended as a description of an exemplary embodiment and is not intended to represent the only way in which the decoding algorithm can be implemented. Various functions and step sequences will be described in order to provide a full understanding of the inventive concepts described throughout this disclosure, however, it is to be understood that the same or equivalent functions and steps may be accomplished with different embodiments that are also intended to be encompassed within the scope of the invention.

Referring to FIG. 9, the decoding algorithm waits for the beginning of the next time slot in step 904. At the beginning of the next time slot, the decoding algorithm determines whether a full C/I ratio estimate is transmitted on the R-CQICH in step 908. If the decoding algorithm detects a full C/I ratio estimate, then in step 910, the decoding algorithm sums the energy of current and all preceding consecutive time slots carrying the full C/I ratio estimate, and computes the probability values $p_i$ for each of the quantized full C/I ratio values using the procedures described in section 1. In step 912, the probability values are then used to compute the probability vector using the procedures described in section 3.1. The decoding algorithm then determines whether the probability vector has been computed for the last time slot carrying the same C/I ratio estimate in step 914. If the decoding algorithm determines that the probability vector has been computed for the last time slot carrying the same C/I ratio estimate, then in step 916, the T/P ratio and repetition rate can be adjusted, if necessary, in accordance with the procedures described in connection with FIG. 8. After the decoding algorithm, in step 916, adjusts the T/P ratio or repetition rate, if necessary, or in step 914 it determines that the probability vector computation was not for the last time slot carrying the same full C/I ratio estimate, a reliability measure is made in step 918 using the procedures described in section 5.

Returning to step 908, if the decoding algorithm determines that the R-CQICH does not contain a full C/I ratio estimate, or alternatively, once the reliability measure is computed in step 918, the decoding algorithm then, in step 920, computes the differential value probabilities using the procedures described in section 2. Next, in step 922, the probability vector is computed using the procedures described in section 3.2. In step 924, a reliability measure is computed for the probability vector computed from the differential value probabilities using the procedures described in section 5. In step 926, the reliability measure for the two probability vectors are compared. If the probability vector computed from the full C/I ratio estimate has the highest reliability (i.e., lowest reliability measure), then it is selected in step 928. If, on the other hand, the probability vector computed from the differential value has the highest probability (i.e., lowest reliability measure), then it is selected in step 930. The selected probability vector is then used in step 932 to compute the C/I ratio value using the procedures described in section 4. The decoding algorithm then loops back to step 904 and waits for beginning of the next time slot.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of communications, comprising:
receiving a feedback signal that is representative of one of a plurality of parameter values relating to a signal transmission;
assigning a probability value to each of the plurality of parameter values as a function of a comparison between the feedback signal and signals that represent each of the parameter values;
decoding the feedback parameter that the feedback signal represents by selecting the highest one of the parameter values which results in the selected one of the parameter values having at least a predetermined probability that it is less than the feedback parameter based on the probability value assignments; and
controlling the signal transmission as a function of the selected one of the parameter values.

2. The method of claim 1 wherein the feedback parameter relates to a measure of quality of the signal transmission over a communications channel.

3. The method of claim 2 wherein the feedback parameter relates to a carrier-to-interference ratio of the signal transmission over the communications channel.

4. The method of claim 1 wherein the feedback parameter comprises a differential value relating to a difference between two of the parameter values.

5. The method of claim 1 wherein the feedback parameter comprises a full value equal to one of the parameter values.

6. The method of claim 5 further comprising receiving a second feedback parameter later in time from the feedback parameter, the second feedback parameter comprising a differential value indicating change from the feedback parameter, the second feedback parameter being used to adjust the probability value assignments.

7. The method of claim 6 wherein the differential value indicates either an increase or a decrease from the feedback parameter.

8. The method of claim 7 wherein the adjustment of the probability value assignments comprises determining a differential probability value relating to an increase in the feedback parameter and a differential probability value relating to a decrease in the feedback parameter, and adjusting the probability value assignments as a function of the differential probability values.

9. The method of claim 8 wherein the adjustment of the probability value assignments comprises convolving the probability value assignments with the differential probability values.

10. The method of claim 1 further comprising computing a reliability measurement of the probability value assignments, and controlling the gain of the feedback parameter as a function of the reliability measurement computation.

11. The method of claim 1 wherein the feedback parameter comprises a full value equal to one of the parameter values, the feedback parameter being received in each of one or more consecutive time slots, the method further comprising computing a reliability measurement of the probability value assignments, and controlling the number of consecutive time slots in which the feedback parameter is received as a function of the reliability measurement computation.

12. The method of claim 1 further comprising receiving a second feedback parameter later in time from the feedback parameter, the second feedback parameter comprising a full value equal to one of the parameters, generating a probability vector comprising new probability value assignments, computing a reliability measurement for the probability vector, and determining whether to use the probability vector to select the selected one of the parameter values as a function of the reliability measurement computation.

13. The method of claim 12 further comprising generating a second probability vector comprising the probability value assignments adjusted independently of the second feedback parameter, and computing a second reliability measurement for the second probability vector, wherein the second probability vector is used to select the selected one of the parameter values if the second reliability measurement computation exceeds the reliability measurement computation.

14. The method of claim 13 wherein the probability value assignments for the second probability vector are adjusted as a function of a differential value relating to an increase or decrease in the feedback parameter.

15. The method of claim 1, wherein the feedback parameter is received over a common channel.

16. Computer readable media embodying a program of instructions executable by a computer program to perform a method of communications, the method comprising:
receiving a feedback signal that is representative of one of plurality of parameter values relating to a signal transmission;
assigning a probability value to each of the plurality of parameter values as a function of comparison between the feedback parameter signal and signals that represent each of the parameter values;
decoding the feedback parameter that the feedback signal represents by selecting the highest of the parameter which results in the selected one of the parameter values having at least a predetermined probability that it is less than the feedback parameter based on the probability value assignments; and
controlling the signal transmission as a function of the selected one of the parameter values.

17. The computer readable media of claim 16 wherein the feedback parameter relates to a measure of quality of the signal transmission over a communications channel.

18. The computer readable media of claim 17 wherein the feedback parameter relates to a carrier-to-interference ratio of the signal transmission over the communications channel.

19. The computer readable media of claim 16 wherein the feedback parameter comprises a differential value relating to a difference between two of the parameter values.

20. The computer readable media of claim 16 wherein the feedback parameter comprises a full value equal to one of the parameter values.

21. The computer readable media of claim 20 wherein the method further comprises receiving a second feedback parameter later in time from the feedback parameter, the second feedback parameter comprising a differential value indicating change from the feedback parameter, the second feedback parameter being used to adjust the probability value assignments.

22. The computer readable media of claim 21 wherein the differential value indicates either an increase or a decrease from the feedback parameter.

23. The computer readable media of claim 21 wherein the adjustment of the probability value assignments comprises determining a differential probability value relating to an increase in the feedback parameter and a differential probability value relating to a decrease in the feedback parameter, and adjusting the probability value assignments as a function of the differential probability values.

24. The computer readable media of claim 23 wherein the adjustment of the probability value assignments comprises convolving the probability values assignments with the differential probability values.

25. The computer readable media of claim 16 wherein the method further comprises computing a reliability measurement of the probability value assignments, and controlling the gain of the feedback parameter as a function of the reliability measurement computation.

26. The computer readable media of claim 16 wherein the feedback parameter comprises a full value equal to one of the parameter values, the feedback parameter being received in each of one or more consecutive time slots, the method further comprising computing a reliability measurement of the probability value assignments, and controlling the number of consecutive time slots in which the feedback parameter is received as a function of the reliability measurement computation.

27. The computer readable media of claim 16 wherein the method further comprises receiving a second feedback parameter later in time from the feedback parameter, the second feedback parameter comprising a full value equal to one of the parameters, generating a probability vector comprising new probability value assignments, computing a reliability measurement for the probability vector, and determining whether to use the probability vector to select the selected one of the parameter values as a function of the reliability measurement computation.

28. The computer readable media of claim 27 wherein the method further comprises generating a second probability vector comprising the probability value assignments adjusted independently of the second feedback parameter, and computing a second reliability measurement for the second probability vector, wherein the second probability vector is used to select the selected one of the parameter values if the second reliability measurement computation exceeds the reliability measurement computation.

29. The computer readable media of claim 28 wherein the probability value assignments for the second probability vector are adjusted as a function of a differential value relating to an increase or decrease from the feedback parameter.

30. A communications apparatus, comprising:
a transceiver having a transmitter configured to generate a signal transmission and a receiver configured to receive a feedback signal that is representative of one of a plurality of parameter values relating to the signal transmission; and
a processor configured to assign a probability value to each of the plurality of parameter values as a function of a comparison between the feedback signal and signals that represent each of the parameter values, decod the feedback parameter that the feedback signal represents by selecting the highest one of the parameter values which results in the selected one of the parameter values having at least a predetermined probability that it is less than the feedback parameter based on the probability value assignments, and control the signal transmission generated by the transmitter as a function of the selected one of the parameter values.

31. The apparatus of claim 30 wherein the feedback parameter relates to a measure of quality of the signal transmission over a communications channel.

32. The apparatus of claim 31 wherein the feedback parameter relates to a carrier-to-interference ratio of the signal transmission over the communications channel.

33. The apparatus of claim 30 wherein the feedback parameter comprises a differential value relating to a difference between two of the parameter values.

34. The apparatus of claim 30 wherein the feedback parameter comprises a full value equal to one of the parameter values.

35. The apparatus of claim 34 wherein the receiver is further configured to receive a second feedback parameter later in time from the feedback parameter, the second feedback parameter comprising a differential value indicating change from the feedback parameter, the second feedback parameter being used by the processor to adjust the probability value assignments.

36. The apparatus of claim 35 wherein the differential value indicates either an increase or a decrease from the feedback parameter.

37. The apparatus of claim 36 wherein the adjustment of the probability value assignments by the processor comprises determining a differential probability value relating to an increase in the feedback parameter and a differential probability value relating to a decrease in the feedback parameter, and adjusting the probability value assignments as a function of the differential probability values.

38. The apparatus of claim 37 wherein the adjustment of the probability value assignments by the processor comprises convolving the probability value assignments with the differential probability values.

39. The apparatus of claim 30 wherein the processor is further configured to compute a reliability measurement of the probability value assignments, and generate a gain control signal for the feedback parameter as a function of the reliability measurement computation, the transmitter being further configured to transmit the gain control signal to a remote location.

40. The apparatus of claim 30 wherein the feedback parameter comprises a full value equal to one of the parameter values, the receiver being further configured to receive the feedback parameter in each of one or more consecutive time slots, and wherein the processor is further configured to compute a reliability measurement of the probability value assignments, and generate a control signal to control the number of consecutive time slots in which the feedback parameter is received as a function of the reliability measurement computation, the transmitter further being configured to transmit the control signal to a remote location.

41. The apparatus of claim 30 wherein the receiver is further configured to receive a second feedback parameter later in time from the feedback parameter, the second feedback parameter comprising a full value equal to one of the parameters, and wherein the processor is further configured to generate a probability vector comprising new probability value assignments, compute a reliability measurement for the probability vector, and determine whether to use the probability vector to select the selected one of the parameter values as a function of the reliability measurement computation.

42. The apparatus of claim 41 wherein the processor is further configured to generate a second probability vector comprising the probability value assignments adjusted independently of the second feedback parameter, and compute a second reliability measurement for the second probability vector, wherein the second probability vector is used by the processor to select the selected one of the parameter values if the second reliability measurement computation exceeds the reliability measurement computation.

43. The apparatus of claim 42 wherein the probability value assignments for the second probability vector are adjusted as a function of a differential value relating to an increase or decrease in the feedback parameter.

44. A communications apparatus, comprising:
means for receiving a feedback signal that is representative of one of the plurality of parameter values relating to a signal transmission;
means for assigning a probability value to each of the plurality of parameter values as a function of a comparison between the feedback signal and signals that represents each of the parameter values;
means for decoding the feedback parameter that the feedback signal represents by selecting the highest one of the parameter values which results in the selected one of the parameter values having at least a predetermined probability that is less than the feedback parameter base on the probability value assignments; and
means for controlling the signal transmission as a function of the selected one of the parameter values.

45. The apparatus of claim 44 wherein the feedback parameter relates to a measure of quality of the signal transmission over a communications channel.

46. The apparatus of claim 45 wherein the feedback parameter relates to a carrier-to-interference ratio of the signal transmission over the communications channel.

47. The apparatus of claim 44 wherein the feedback parameter comprises a differential value relating to a difference between two of the parameter values.

48. The apparatus of claim 44 wherein the feedback parameter comprises a full value equal to one of the parameter values.

49. The apparatus of claim 48 wherein the means for receiving a feedback parameter is further configured to receive a second feedback parameter later in time from the feedback parameter, the second feedback parameter comprising a differential value indicating change from the feedback parameter, the apparatus further comprising means for adjusting the probability value assignments as a function of the second feedback parameter.

50. The apparatus of claim 49 wherein the differential value indicates either an increase or a decrease from the feedback parameter.

51. The apparatus of claim 50 wherein the means for adjusting the probability value assignments comprises means for determining a differential probability value relating to an increase in the feedback parameter and means for determining a differential probability value relating to a decrease in the feedback parameter, the adjustment of the probability value assignments being a function of the differential probability values.

52. The apparatus of claim 51 wherein the means for adjusting the probability value assignments comprises means for convolving the probability value assignments with the differential probability values.

53. The apparatus of claim 44 further comprising means for computing a reliability measurement of the probability value assignments, and means for controlling the gain of the feedback parameter as a function of the reliability measurement computation.

54. The apparatus of claim 44 wherein the feedback parameter comprises a full value equal to one of the parameter values, the feedback parameter being received in each of one or more consecutive time slots, the apparatus further comprising means for computing a reliability measurement of the probability value assignments, and means for controlling the number of consecutive time slots in which the feedback parameter is received as a function of the reliability measurement computation.

55. The apparatus of claim 44 wherein the means for receiving a feedback parameter is further configured to receive a second feedback parameter later in time from the feedback parameter, the second feedback parameter comprising a full value equal to one of the parameters, the apparatus further comprising means for generating a probability vector comprising new probability value assignments, means for computing a reliability measurement for the probability vector, and means for determining whether to use the probability vector to select the selected one of the parameter values as a function of the reliability measurement computation.

56. The apparatus of claim 55 further comprising means for generating a second probability vector comprising the probability value assignments adjusted independently of the second feedback parameter, and means for computing a second reliability measurement for the second probability vector, wherein the second probability vector is used to select the selected one of the parameter values if the second reliability measurement computation exceeds the reliability measurement computation.

57. The apparatus of claim 56 wherein the probability value assignments for the second probability vector are adjusted as a function of a differential value relating to an increase or decrease in the feedback parameter.

58. A method of communications, comprising:
receiving a feedback signal that is representative of one of a plurality of parameter values relating to a signal transmission, wherein the feedback parameter relates to a carrier-to-interference
ratio of the signal transmission over the communications channel;
assigning a probability value to each of the plurality of parameter values as a function of a comparison between the feedback signal and signals that represents each of the parameter values by correlating an estimate of the one or more of a plurality of parameter values with a code word;
decoding the feedback parameter that the feedback signal represents by selecting the highest one of the parameter values which results in the selected one of the parameter values having at least a predetermined probability that it is less than the feedback parameter based on the probability value assignments; and
controlling the signal transmission as a function of the selected one of the parameter values.

* * * * *